United States Patent
Shkolnikov et al.

(10) Patent No.: US 11,325,125 B2
(45) Date of Patent: May 10, 2022

(54) PARTICLE SEPARATION

(71) Applicant: HEWLETT-PACKARD DEVELOPMENT COMPANY, L.P., Houston, TX (US)

(72) Inventors: Viktor Shkolnikov, Palo Alto, MI (US); Chien-Hua Chen, Corvallis, OR (US)

(73) Assignee: Hewlett-Packard Development Company, L.P., Spring, TX (US)

(*) Notice: Subject to any disclaimer, the term of this patent is extended or adjusted under 35 U.S.C. 154(b) by 947 days.

(21) Appl. No.: 16/076,074

(22) PCT Filed: Apr. 23, 2017

(86) PCT No.: PCT/US2017/029028
§ 371 (c)(1),
(2) Date: Aug. 7, 2018

(87) PCT Pub. No.: WO2018/199874
PCT Pub. Date: Nov. 1, 2018

(65) Prior Publication Data
US 2021/0213451 A1 Jul. 15, 2021

(51) Int. Cl.
*B01L 3/00* (2006.01)
*B03C 5/00* (2006.01)
(Continued)

(52) U.S. Cl.
CPC ... *B01L 3/502761* (2013.01); *B01L 3/502776* (2013.01); *B03C 5/005* (2013.01);
(Continued)

(58) Field of Classification Search
None
See application file for complete search history.

(56) References Cited

U.S. PATENT DOCUMENTS

| 4,032,929 A | 6/1977 | Fischbeck |
| 5,106,468 A | 4/1992 | Chimenti |

(Continued)

FOREIGN PATENT DOCUMENTS

| CN | 1337580 A | 2/2002 |
| CN | 1346053 A | 4/2002 |

(Continued)

OTHER PUBLICATIONS

Engineering ToolBox, Resistivity and Conductivity—Temperature Coefficients for Common Materials, [online] Available at: https://www.engineeringtoolbox.com/resistivity-conductivity-d_418.html [Accessed Sep. 11, 2021] (Year: 2003).*

(Continued)

*Primary Examiner* — J. Christopher Ball
(74) *Attorney, Agent, or Firm* — Tong Rea Bentley & Kim LLC

(57) ABSTRACT

A fluid entrained particle separator may include an inlet passage to direct particles entrained in a fluid, a first separation passage branching from the inlet passage, a second separation passage branching from the inlet passage and electrodes to create electric field exerting a dielectrophoretic force on the particles to direct the particles to the first separation passage or the second separation passage, wherein the first separation passage, the second separation passage, the electric field and the dielectrophoretic force extend in a plane.

15 Claims, 9 Drawing Sheets

(51) Int. Cl.
  *B03C 5/02* (2006.01)
  *G01N 1/40* (2006.01)

(52) U.S. Cl.
  CPC .............. *B03C 5/026* (2013.01); *G01N 1/40* (2013.01); *B01L 2300/0816* (2013.01); *B01L 2300/0864* (2013.01); *B01L 2400/0424* (2013.01); *B03C 2201/18* (2013.01); *B03C 2201/26* (2013.01); *G01N 2001/4038* (2013.01)

(56) References Cited

U.S. PATENT DOCUMENTS

| | | | |
|---|---|---|---|
| 5,218,754 | A | 6/1993 | Rangappan |
| 6,991,906 | B1 | 1/2006 | Fuhr et al. |
| 7,338,580 | B2 | 3/2008 | Conta |
| 7,384,791 | B2 | 6/2008 | Tyvoll et al. |
| 7,390,387 | B2 | 6/2008 | Childers et al. |
| 7,438,392 | B2 | 10/2008 | Vaideeswaran |
| 7,713,395 | B1 | 5/2010 | James et al. |
| 8,109,614 | B2 | 2/2012 | Giovanola et al. |
| 8,695,640 | B2 | 4/2014 | Unger et al. |
| 9,535,000 | B2 | 1/2017 | Sadri et al. |
| 9,555,421 | B2 | 1/2017 | Sato et al. |
| 9,592,501 | B2 | 3/2017 | Jarvius |
| 10,078,066 | B2 | 9/2018 | Davalos et al. |
| 10,343,165 | B2 | 7/2019 | Sadri et al. |
| 2005/0158704 | A1 | 7/2005 | Tyvoll et al. |
| 2006/0001039 | A1 | 1/2006 | Zamanian |
| 2006/0177815 | A1 | 8/2006 | Soh et al. |
| 2007/0125941 | A1 | 6/2007 | Lee et al. |
| 2009/0139866 | A1 | 6/2009 | Nam et al. |
| 2012/0298511 | A1 | 11/2012 | Yamamoto |
| 2013/0029407 | A1 | 1/2013 | Terazono |
| 2014/0262970 | A1 | 9/2014 | Sato et al. |
| 2014/0346044 | A1 | 11/2014 | Cammarata |
| 2015/0306599 | A1 | 10/2015 | Khandros et al. |
| 2016/0001551 | A1 | 1/2016 | Chen et al. |
| 2016/0299138 | A1 | 10/2016 | Almasri et al. |
| 2017/0276679 | A1 | 9/2017 | Chapman et al. |
| 2018/0106805 | A1 | 4/2018 | Allen et al. |
| 2018/0134039 | A1 | 5/2018 | Chen et al. |

FOREIGN PATENT DOCUMENTS

| | | |
|---|---|---|
| CN | 1608850 A | 4/2005 |
| CN | 101277724 A | 10/2008 |
| CN | 100577266 | 1/2010 |
| CN | 101762440 A | 6/2010 |
| CN | 102703373 | 10/2012 |
| CN | 102725060 | 10/2012 |
| CN | 103194370 | 7/2013 |
| CN | 103194371 | 7/2013 |
| CN | 103196725 | 7/2013 |
| CN | 103620398 A | 3/2014 |
| CN | 103733021 A | 4/2014 |
| CN | 203648695 U | 6/2014 |
| CN | 104379263 A | 2/2015 |
| CN | 105121171 A | 12/2015 |
| CN | 105189122 A | 12/2015 |
| CN | 105312155 A | 2/2016 |
| CN | 105555412 A | 5/2016 |
| CN | 107901609 A | 4/2018 |
| CN | 107949481 A | 4/2018 |
| EP | 2715450 B1 | 7/2018 |
| JP | 60-121742 A | 6/1985 |
| JP | S60121742 A | 6/1985 |
| JP | 2000-093839 A | 4/2000 |
| JP | 2002321374 A | 11/2002 |
| JP | 2004113223 | 4/2004 |
| JP | 4932066 | 5/2012 |
| JP | 2014178119 | 9/2014 |
| JP | 5807004 | 11/2015 |
| TW | 201532848 A | 9/2015 |
| WO | 2011/036433 A1 | 3/2011 |
| WO | WO-2011067961 | 6/2011 |
| WO | WO-201 1105507 | 9/2011 |
| WO | WO-2015080730 A1 | 6/2015 |
| WO | 2016025518 A1 | 2/2016 |
| WO | WO-2017078716 A1 | 5/2017 |
| WO | WO-2018199874 | 11/2018 |
| WO | WO-2018208276 | 11/2018 |
| WO | WO-2019027432 | 2/2019 |
| WO | WO-2019094022 A1 | 5/2019 |

OTHER PUBLICATIONS

Yue et al., "The Development of Dieletrophoresis and Effects of the Physical Parameter on Dieletrophoresis", Environmental Science & Technology, vol. 32, No. 6C, Jun. 30, 2009, pp. 176-180.

Wang, Lisen et al. "Dielectrophoresis witching with vertical sidewall electrodes for microfluidic flow cytometry." Lab on a Chip, Royal Society of Chemistry, vol. 7, No. 25, Jun. 2007 (Jun. 25, 2007), pp. 1114-1120.

Jeon et al., "Continuous Particle Separation Using Pressure-driven Flow-induced Miniaturizing Free-flow Electrophoresis", Scientific Reports 6, Article No. 19911, Retrieved from Internet—http://www.nature.com/articles/srep19911, 2016, 26 Pages.

Jia et al., "Continuous Dielectrophoretic Particle Separation Using a Microfluidic Device With 3D Electrodes and Vaulted Obstacles", Electrophoresis, vol. 36, Retrieved from Internet—https://onlinelibrary.wiley.com/doi/abs/10.1002/elps.201400565, 2015, pp. 1744-1753.

Lewpiriyawong et al., "Dielectrophoresis Field-Flow Fractionation for Continuous-Flow Separation of Particles and Cells in Microfluidic Devices", Advances in Transport Phenomena, Retrieved from Internet—https://link.springer.com/chapter/10.1007%2F978-3-319-01793-8_2, 2013, pp. 29-62.

* cited by examiner

PARTICLE SEPARATION

BACKGROUND

The separation of particles is performed various industries. For example, in biology and medicine, rare cells are often separated from a patient's blood for diagnosis. Separation of particles, such as rare blood cells, presents many challenges.

Figure 1:
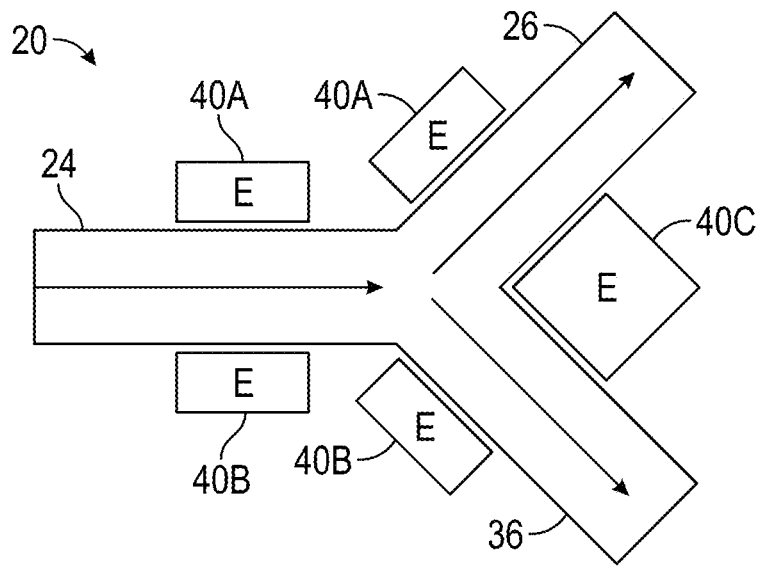
FIG. 1 is a schematic diagram of a portion of example fluid entrained particle separator.

Throughout the drawings, identical reference numbers designate similar, but not necessarily identical, elements. The figures are not necessarily to scale, and the size of some parts may be exaggerated to more clearly illustrate the example shown. Moreover the drawings provide examples and/or implementations consistent with the description; however, the description is not limited to the examples and/or implementations provided in the drawings.

DETAILED DESCRIPTION OF EXAMPLES

Disclosed herein are example particle separators that separate particles, such as biological cells, based on the size and electric polarizability of the particles relative to one another and/or the surrounding media. Particle polarization properties are a function of the imposed electric field frequency. Because the field frequency may be easily modified, such particle separators are highly adaptable and applicable to your range of particles and applications.

Disclosed herein are example particle separators that have geometries and an architecture that facilitates uniform force fields. As a result, particle separation reproducibility and reliability are enhanced. The disclosed particle separators may further position the particles within the stream at predictable locations within the generated hydrodynamic force field. As a result, the particles are reproducibly and reliably separated and directed to two different regions, or two different separation passages, for consistent results.

Disclosed herein are example fluid entrained particle separators that facilitate the separation of different particles using dielectrophoretic forces. The fluid particles being separated are entrained in a fluid which is directed through an inlet passage. Electrodes create an electric field which exerts a dielectrophoretic force on the particles to direct the particles from the inlet passage to different separation passages.

In some implementations, a particle focuser is utilized to focus particles entrained in the fluid into a laminar flow within the inlet passage prior to separation. In one implementation, the particle focuser may comprise a hydrodynamic focuser that utilizes first and second sheath flows of a buffer solution that sandwich the solution containing the particles to provide such laminar flow. In other implementations, other particle focusers, such as free flow negative dielectrophoresis particle focusers and free flow isotachophoresis particle focusers, may be employed.

In one implementation, the separation passages and the electrodes are located and oriented such that the electric field produced by the electrodes and the resulting dielectrophoretic forces extend in a single plane with the separation passages. Because the separation passages, the electric field and the dielectrophoretic forces extend in a single plane, the separation of particles is more predictable and less chaotic, producing more reliable results.

Disclosed herein is an example fluid entrained particle separator that may include an inlet passage to direct particles entrained in a fluid, a first separation passage branching from the inlet passage, a second separation passage branching from the inlet passage and electrodes to create an electric field that exerts a dielectrophoretic force on the particles. The dielectrophoretic force directs the particles to the first separation passage or the second separation passage. The first separation passage, the second separation passage, the electric field and the dielectrophoretic forces extend in a plane.

Disclosed herein is an example method for separating particles entrained in a fluid. The method may include directing particles entrained in a stream through an inlet passage. The method may further include applying an electric field in a plane to the stream to exert dielectrophoretic forces in the plane on the particles to divert a first subset of the particles in the stream into a first separation passage extending in the plane and to divert a second subset of particles in the stream into a second separation passage extending in the plane.

Disclosed herein is an example method for forming a fluid entrained particle separator. The method may include forming an inlet passage, a first separation passage branching from the inlet passage and a second separation passage branching from the inlet passage. Electrodes are formed on side surfaces of the first separation passage and the second separation passage. The electrodes are electrically isolated on opposite side surfaces from one another.

FIG. 1 is a schematic diagram illustrating some portions of an example fluid entrained particle separator 20. Separator 20 comprises inlet passage 24, separation passage 26, separation passage 36 and electrodes 40A, 40B and 40C (collectively referred to as electrodes 40). Inlet passage 24 comprises a channel, such as a microfluidic channel, that guides a solution containing particles to be separated.

Separation passages 26 and 36 comprise channels, such as microfluidic channels that extend from and branch off of inlet passage 24. Separation passages 26, 36 lead to distinct destinations where the separated particles or cells may be collected and analyzed. In some implementations, particles directed to separation passage 26 or directed separation passage 36 may be further separated downstream. In the example illustrated, separation passages 26, 36 extend a single plane, such as a single horizontal plane. In some implementations, separation passages 26, 36 extend in the same plane as inlet passage 24. Although passages 26, 36 are illustrated as branching off of inlet passage 24 at angles of 135°, it should be appreciated that passages 26 and 36 may extend at other angles from inlet passage 24.

Electrodes 40 are provided to create electric fields across passages 24, 26 and 36, Electrodes 40 extend in a single plane such that they produce electric fields that extend in the same plane as that of passages 24, 26 and 36. Because the separation passages, the electric field and the dielectrophoretic force extend in a single plane, the separation of particles is more predictable and less chaotic, producing more reliable results.

In the example illustrated, electrodes 40A extend alongside passages 24 and 26. Electrodes 40B extend alongside passages 24 and 36. Electrode 40C extends alongside passages 26 and 36. As should be appreciated, each of electrodes 40 may be a continuous electrode or may be formed by multiple separate elements connected to ground or a source of electrical current, such as an alternating frequency electric current source.

In one implementation, electrodes 40A and 40B are separated by a distance across inlet passage 24 by distance of at least 10 times a diameter of a target particle to be separated. Likewise, electrodes 40A and 40C as well as electrodes 40B and 40C are also separated by distance across separation passages 26 and 36, respectively, by a distance of at least 10 times a diameter of the target particle(s) being separated. This separation reduces the likelihood that the global electric field will not be significantly distorted by the presence of the particle such that similar separations are carried out on all particles in the flow.

Figure 2:
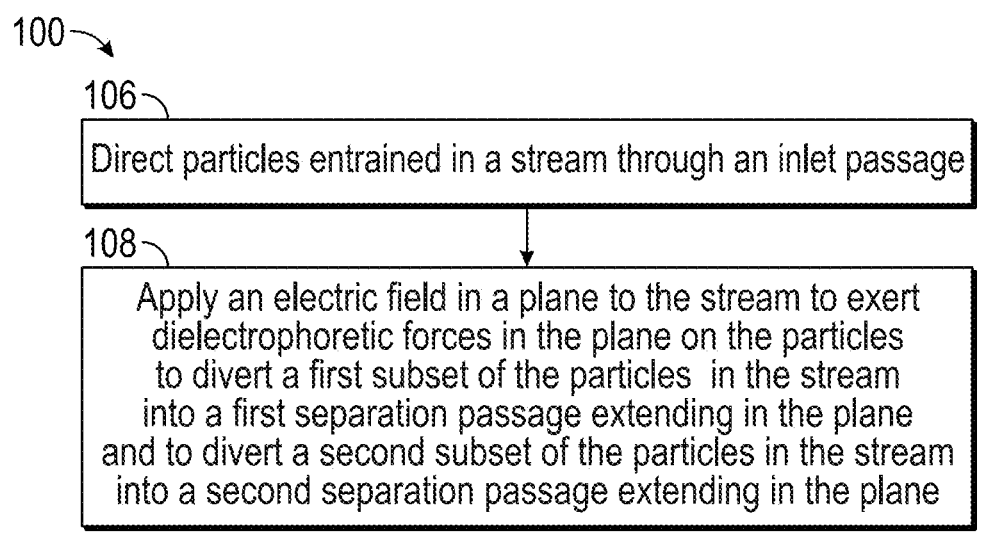
FIG. 2 is a flow diagram of an example method for separating fluid entrained particles.

FIG. 2 is a flow diagram of an example method 100 for separating fluid entrained particles. Method 100 provides for particle separation in a more predictable and less chaotic fashion, producing more reliable results. Although method 100 is described as being carried out with separator 20, it should be appreciated that method 100 may be carried out with any of the following described separators or the others similar particle separators.

As indicated by block 106, particles to be separated are entrained in a stream and directed through inlet passage 24. The particles may be co-mingled with other particles. For example, certain target particles to be separated, such as rare biological cells, may be co-mingled with other biological cells or other particles. As will be described hereafter, in some implementations, the particles may be focused prior to or within inlet passage 24 prior to being separated. In one implementation, the particles may be focused so as to have a laminar flow through inlet passage 24. In one implementation, the particles may be focused with a hydrodynamic focuser which sandwiches fluid entrained particles between sheet flows of at least one buffer solution. In yet other implementations, the fluid entrained particles may be focused in other manners.

As indicated by block 108, electrodes 40 apply electric fields in a plane to the stream of fluid entrained particles. In one implementation, an alternating current at a predetermined frequency is applied to the electrodes 40. In one implementation, the alternating current applied to electrodes 40 has a frequency of between 20 kHz and 200 kHz and nominally 60 kHz. The electric fields exert dielectrophoretic forces in a plane on the particles, the same plane in which inlet passage 24 and separation passages 26, 36 extend and the same plane in which the electric fields extend. The particles are separated based upon their different responses to the dielectrophoretic forces as a result of their different size and electric polarizability. The dielectrophoretic forces divert a first subset of the particles in the stream into a first separation passage 26 extending in the plane and divert a second subset of the particles in the stream into a second separation passage 36 extending in the plane.

Figure 3:
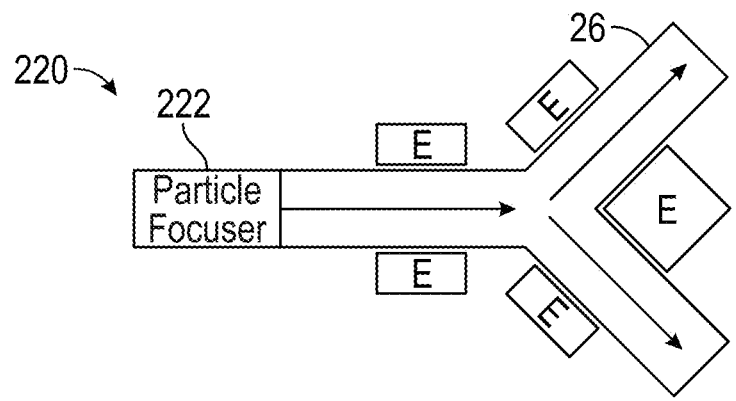
FIG. 3 is a schematic diagram of a portion of another example fluid entrained particle separator.

FIG. 3 is a schematic diagram of another example fluid entrained particle separator 220. Separator 220 is similar to separator 20 described above except that separator 220 additionally comprises particle focuser 222. Those remaining components of separator 220 that correspond to components of separator 20 are in numbered similarly.

Particle focuser 222 focuses the fluid entrained particles prior to or within inlet passage 24 prior to being separated. In one implementation, focuser 222 focuses the particles into a laminar flow through inlet passage 24. In one implementation, focuser 222 comprises a hydrodynamic focuser which sandwiches fluid entrained particles between sheath flows of at least one buffer solution. In other implementations, focuser 222 may comprise other particle focusers such as free flow negative dielectrophoresis particle focuser or a free flow isotachophoresis particle focuser. In yet other implementations, the fluid entrained particles may be focused in other manners. The focusing of the fluid containing the particles to be separated enhances separation performance of separator 220. However, in some implementations, such particle focusing may be omitted.

Figure 4:
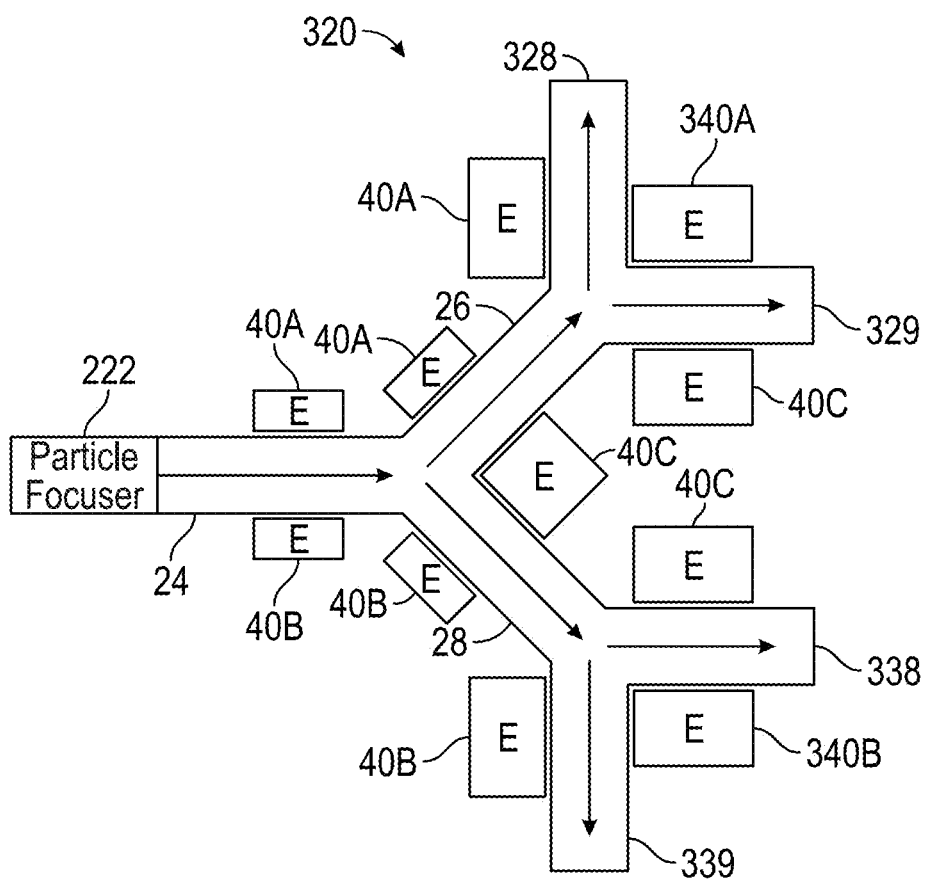
FIG. 4 is a schematic diagram of a portion of another example fluid entrained particle separator.

FIG. 4 is a schematic diagram of another example fluid entrained particle focuser 320. Particle focuser 320 is similar to focuser 220 except that separation passages 26, 36 comprise primary separation passages and that particle focuser 320 additionally comprises secondary separation passages 328, 329, 338, 339 and electrodes 340A, 340B (collectively referred to as electrodes 340). Those remaining components of focuser 320 which correspond to components of focuser 220 are numbered similarly.

Secondary separation passages 328, 329 comprise channels, such as microfluidic channels that extend from and branch off of primary separation passage 26. Separation passages 328, 329 lead to distinct destinations where the separated particles or cells may be collected and analyzed. In the example illustrated, separation passages 328, 329 extend in a single plane, such as a single horizontal plane. In some implementations, separation passages 328, 329 extend in the same plane as separation passage 26. Although passages 328, 329 are illustrated as branching off of separation passage 26 at angles of 135°, it should be appreciated that passages 328, 329 may extend at other angles from separation passage 26.

Secondary separation passages 338, 339 comprise channels, such as microfluidic channels, that extend from and branch off of primary separation passage 28. Separation passages 338, 339 lead to distinct destinations where the separated particles may be collected and analyzed. In the example illustrated, separation passages 338, 339 extend in a single plane, such as a single horizontal plane. In some implementations, separation passages 338, 339 extend in the same plane as separation passage 28. Although passages 338, 339 are illustrated as branching off of separation passage 28 at angles of 135°, it should be appreciated that passages 338, 339 may extend at other angles from separation passage 28.

Electrodes 340 are provided to create electric fields across secondary separation passages 328, 329, 338, 339. Electrodes 340 extend in a single plane such that they produce electric field that extends in the same plane as that of passages 24, 26 and 36 as well as passages 328, 329, 338, 339. Because the separation passages, the electric field and the dielectrophoretic force extend in a single plane, the separation of particles is more predictable and less chaotic, producing more reliable results.

In the example illustrated, electrode 340A extends alongside passages 328, 329. Electrode 340B extends alongside passages 338, 339. Electrode 340A cooperates with electrode 40A to establish and electric field across secondary separation passage 328. Electrode 340A cooperates with electrode 400 to establish field across secondary separation passage 329. Electrode 340B cooperates with electrode 40C to establish field across secondary separation passage 338. Electrode 340B coffers with electrode 40B to establish an electric field across secondary separation passage 339. As should be appreciated, each of electrodes 40B and 40C may be a continuous electrode or may be formed by multiple separate elements connected to ground or a source of electrical current, such as an alternating frequency electric current source.

In one implementation, electrodes 340A and 40A are separated by a distance across secondary separation passage 328 by distance of at least 10 times a diameter of a target particle to be separated. Likewise, electrodes 340A and 40C, electrodes 340B and 40C as well as electrodes 340B and 40B are also separated by distance across separation passages 329, 338 and 339, respectively, by a distance of at least 10 times a diameter of the target particle(s) being separated. This separation reduces the likelihood that the global electric field will not be significantly distorted by the presence of the particle such that similar separations are carried out on all particles in the flow.

Particle focuser 320 performs multi-staged particle separation. In the example illustrated, the laminar flow of fluid containing the particles to be separated is directed along inlet passage 24. The electric fields extending across passage 24 as well as passages 26 and 28 create dielectrophoretic forces that differently direct with different particles based upon differences in particle size and electric polarity. The different responses of the different particles to the dielectrophoretic forces results in the laminar flow of fluid splitting, with a first portion of particles being diverted along separation passage 26 and a second portion of the particles being diverted along separation passage 28. Thereafter, the electric fields created across passages 328 and 329 create dielectrophoretic forces that differently interact with different particles within separation passage 26 based upon differences in particle size and electric polarity to further split the stream of particles within separation passage 26 such that a first portion is further diverted along separation passages 328 and a second portion is further diverted along separation passage 329.

Likewise, the electric fields created across passages 338 and 339 create dielectrophoretic forces that differently direct with different particles within separation passage 28 based upon differences in particle size and electric polarity to further split the stream of particles within separation passage 28 such that a first portion is further diverted along separation passages 338 and a second portion is further diverted along separation passage 339. As a result, the original stream of fluid entrained particles is separated into four different sets of particles or groups of particles. Each group of particles has particles of similar sizes and/or electric polarities. Each group of particles as particles that are sized or that have electrical polarities different than particles of other groups.

Figure 5:
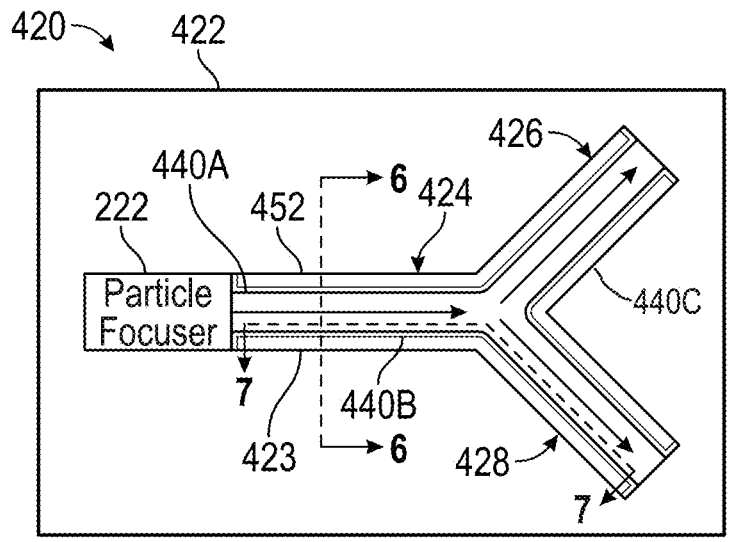
FIG. 5 is a schematic diagram of a portion of another example fluid entrained particle separator.
Figure 6:
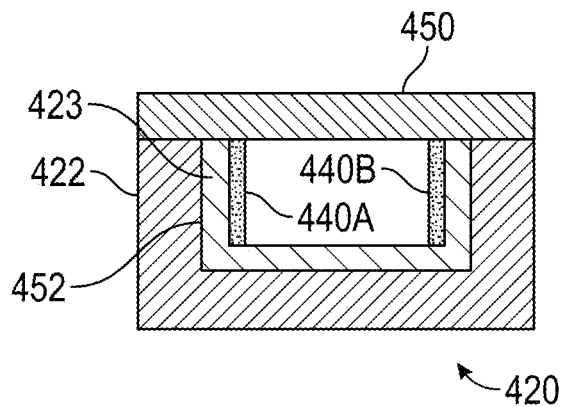
FIG. 6 is a sectional view of the fluid entrained particle separator of FIG. 5 taken along line 6-6.
Figure 7:
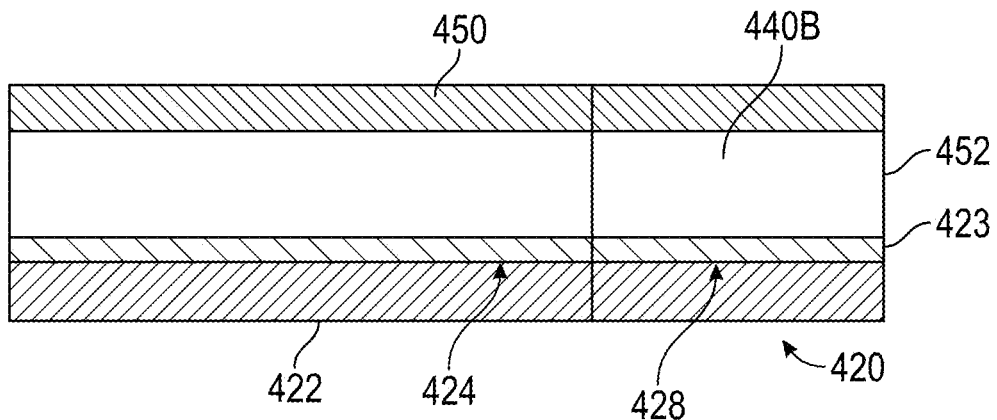
FIG. 7 is a sectional view of the fluid entrained particle separator of FIG. 5 taken along line 7-7.

FIGS. 5-7 illustrate another example fluid entrained particle separator 420. FIG. 6 is a sectional view of separator 420 taken along line 6-6 of FIG. 5. FIG. 7 is a sectional view taken along line 7-7 of FIG. 5. Particle separator 420 comprises substrate 422, dielectric layer 423, inlet passage 424, primary separation passages 426, 428, electrodes 440A, 440B and 4400, particle 222 (described above) and cover layer 450.

Substrate 422 comprises at least one layer of material having a series of connected in branching grooves 452 formed therein which partially form passages 424, 426 and 428. In one implementation, grooves 452 are formed by imprinting or molding of a layer material forming substrate 422. In another implementation, grooves 452 are formed by cutting, ablation, etching or other material removal processes carried out on the layer or layers of material forming substrate 422. In another implementation, grooves 452 are formed by selective deposition, such as printing or additive manufacturing processes carried out upon an underlying base layer or platform.

In the example illustrated, substrate 422 comprises a material having an impedance less than or insufficiently greater than that of the stream of fluid particles to be directed through such passages 424, 426, 428. In one implementation, substrate 422 comprises a material having an impedance of less than 10,000 ohm centimeters. In one implementation, substrate 822 comprises a silicon material having an impedance of less than 10,000 ohm centimeters.

Dielectric layer 423 comprising a layer of material formed upon or coating a floor and opposing sidewalls of grooves 452. Dielectric layer 423 is formed from a material and has a sufficient thickness such as electric field passes through and across the fluid within passages 424, 426, 428 rather than through substrate 422. In one implementation, dielectric layer 423 is formed from a material having sufficient dielectric properties and dimensioned such that the impedance of the path through layer 423 is at a level of at least five times that of the impedance of the path of the fluid across passages 424, 426 and 428. In one implementation, layer 423 is formed from a material having sufficient dielectric properties and dimensioned such that the impedance of the path through layer 423 is at a level of at least 10 times that of the impedance of the path of the fluid across passages 424, 426 and 428. In one implementation, layer 423 is formed from material having an impedance of at least 10,000 ohm centimeters. In one implementation, layer 423 is formed from a material such as silicon nitride or silicon dioxide. It in yet other implementations, layer 423 may be formed from other materials having sufficient impedances.

Electrodes 440 are provided to create electric fields across passages 424, 426 and 428. Electrodes 440 extend in a single plane such that they produce electric field that extends in the same plane as that of passages 424, 426 and 428. Because the separation passages, the electric fields and the dielectrophoretic forces extend in a single plane, the separation of particles is more predictable and less chaotic, producing more reliable results.

In the example illustrated, electrode 440A extends alongside passages 424 and 428. Electrode 440B extends alongside passages 424 and 428. Electrode 440C extends alongside passages 426 and 428. Each of the electrodes 440 are connected to the source of electrical charge, such as a source of an alternating current having a predefined frequency based upon polarization properties of the particles to be separated.

In one implementation, electrodes 440A and 440B are separated by a distance across inlet passage 424 by distance of at least 10 times a diameter of a target particle to be separated. Likewise, electrodes 440A and 440C as well as electrodes 440B and 440C are also separated by distance across separation passages 428 and 426, respectively, by a distance of at least 10 times a diameter of the target particle(s) being separated. This separation reduces the likelihood that the global electric field will not be significantly distorted by the presence of the particle such that similar separations are carried out on all particles in the flow.

In one implementation, electrodes 440 are formed over dielectric layer 423 on the side surfaces of grooves 452 without extending across the floor of such grooves 452. In one implementation, electrodes 440 are formed using directional sputtering or angled sputtering which deposits electrically conductive material on layer 423 on the sides of grooves 452 without or with minimal deposition on the floor of such grooves 452. In yet other implementations, the electrically conductive material that forms electrodes 440 may be deposited upon layer 423 on the floor of grooves 452, wherein the electric conductive material deposited on layer 423 on the floor of grooves 452 is subsequently removed while leaving the electrically conductive material on the sides to form electrodes 440.

Passages 424, 426 and 428 are completed by the formation of or provision of cover layer or cover panel 450. In such an implementation, cover panel 450 also has an impedance greater than that of the stream of fluid particles to be directed through such passages 424, 426, 428 such that the electric field created by electrodes 440 will pass through the stream of fluid particles rather than through the ceiling provided by cover panel 450. In one implementation, cover panel 450 is formed from material having an impedance of at least 10,000 ohm centimeters. In one implementation, cover panel 450 is formed from a material such as glass, silicon nitride or silicon dioxide. It in yet other implementations, cover panel 450 may be formed from other materials having sufficient impedances.

Figure 8:
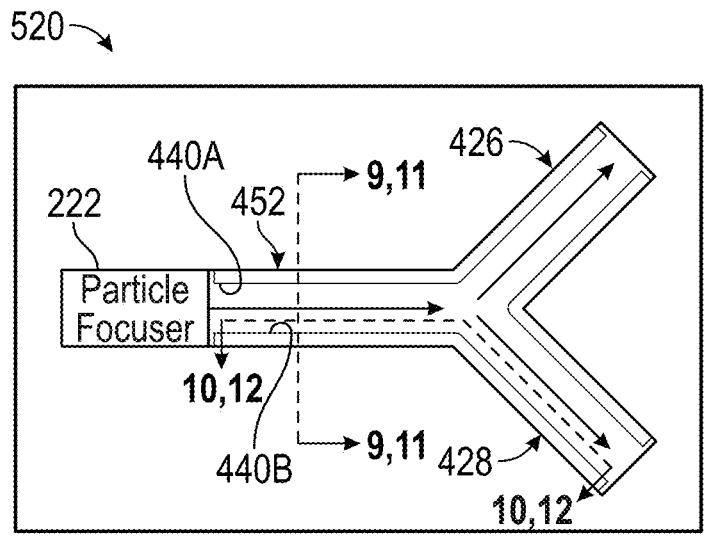
FIG. 8 is a schematic diagram of a portion of another example fluid entrained particle separator.
Figure 9:
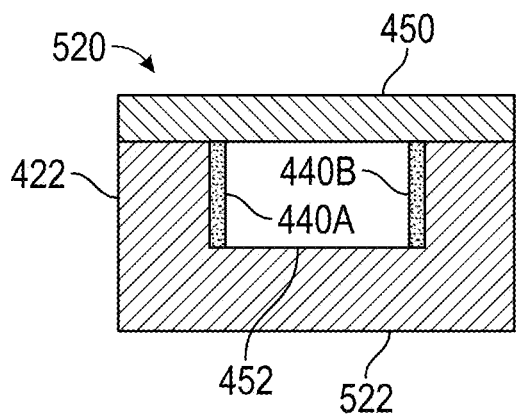
FIG. 9 is a sectional view of the fluid entrained particle separator of FIG. 8 taken along line 9-9.
Figure 10:
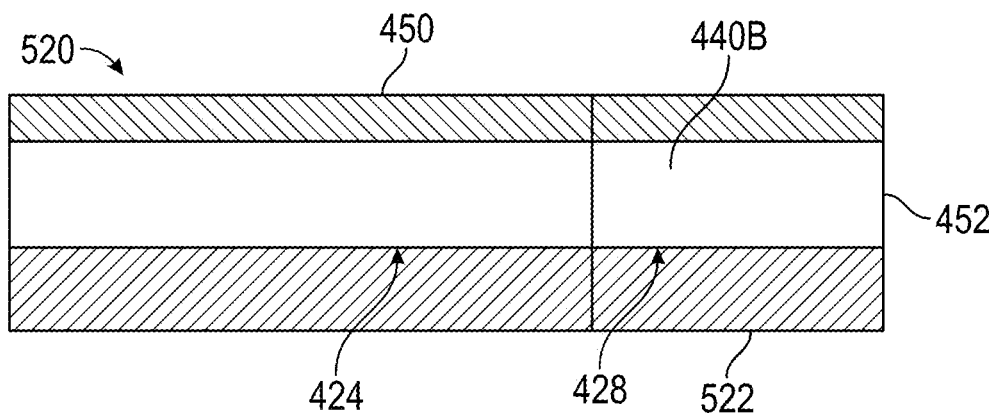
FIG. 10 is a sectional view of the fluid entrained particle separator of FIG. 8 taken along line 10-10.

FIGS. 8-10 illustrate separator 520, another example of separator 420 formed according to a different example method. FIG. 8 is a top view of separator 520. FIG. 9 is a sectional view of separator 520 taken along line 9-9. Separator 520 is similar to separator 420 except that separator 520 comprises substrate 522 in place of substrate 422 and omits dielectric layer 523. Those remaining components of particle separator 520 correspond to components of particle separator 420 are numbered similarly.

Substrate 522 is similar to substrate 422 in that substrate 522 has formed therein grooves 452 that define passages 424, 426 and 428. However, unlike substrate 422, substrate 522 is formed from a material having sufficient dielectric properties and dimensioned such that the impedance of the path through substrate 522 is at a level of at least five times that of the impedance of the path of the fluid across passages 424, 426 and 428. In one implementation, substrate 522 is formed from a material having sufficient dielectric properties and dimensioned such that the impedance of the path through substrate 522 is at a level of at least 10 times that of the impedance of the path of the fluid across passages 424, 426 and 428. In one implementation, substrate 522 is formed from material having an impedance of at least 10,000 ohm centimeters. In one implementation, substrate 522 is formed from a material such as silicon nitride, silicon dioxide or glass. It in yet other implementations, substrate 522 may be formed from other materials having sufficient impedances. Due to the high impedance provided by substrate 522, dielectric layer 423 is omitted, wherein electrodes 440 are formed directly on the material substrate 522 along the sides of grooves 452. In one implementation, electrodes 440 are formed using directional sputtering or angled sputtering which deposits electric conductive material on the sides of passages 424, 426 and 428 without or with minimal deposition on the floor of such passages. In yet other implementations, the electrically conductive material that forms electrodes 440 may be deposited upon the floor the passages 424, 426 and 428, wherein the material on the floor of the passages is subsequently removed. Passages 424, 426 and 428 are completed by the formation of or provision of cover layer or cover panel 450, described above.

Figure 11:
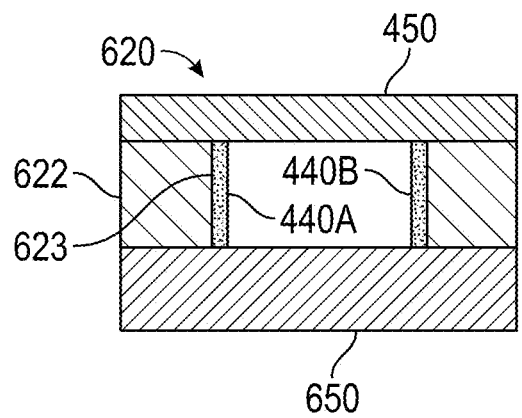
FIG. 11 is a sectional view of another example fluid entrained particle separator taken along line 11-11 of FIG. 8.
Figure 12:
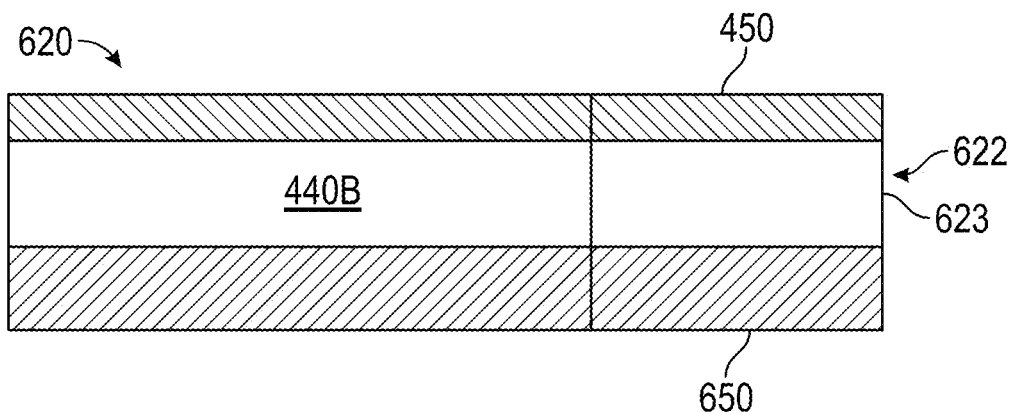
FIG. 12 is a sectional view of the fluid entrained particle separator of FIG. 11 taken along line 12-12 of FIG. 8.

FIGS. 8, 11 and 12 illustrate another example fluid entrained particle separator 620. FIG. 11 is a sectional view of separator 620 taken along line 11-11. FIG. 12 is a sectional view taken along line 12-12. Separator 620 is similar to separator 520 described above except that separator 620 comprises substrate 622 and additionally comprises floor layer 650. Those remaining components of separator 620 which correspond to components of separator 520 are numbered similarly.

Substrate 622 is similar to substrate 522 except that instead of having grooves 452 that extend into substrate 622 and that at least partially define passages 424, 426 and 428, substrate 622 has a series of connected and branching through slots 623 extending completely through substrate 622. In one implementation, slots 623 or formed through substrate 622 by material removal processes such as etching, ablation or cutting performed on substrate 622. In other implementations, slots 623 may be formed during the molding or additive manufacturing/printing of substrate 622. Because substrate 622 does not form the floor of passages 424, 426 and 428, substrate 622 baby formed from a wider variety or range of materials having impedances less than that of substrate 522.

Floor layer 650 comprises a layer or panel joined to substrate 622 opposite cover layer 450. Like cover layer 450, floor layer 650 has an impedance greater than that of the stream of fluid particles to be directed through such passages 424, 426, 428 such that the electric field created by electrodes 440 will pass through the stream of fluid particles rather than through the floor provided by floor layer 650. In one implementation, floor layer 650 is formed from material having an impedance of at least 10,000 ohm centimeters. In one implementation, floor layer 650 is formed from a material such as glass, silicon nitride or silicon dioxide. It in yet other implementations, floor layer 650 may be formed from other materials having sufficient impedances.

In one implementation, floor layer 650 is laminated or otherwise bonded to substrate 622 after channels 424, 426 and 428 have been formed through substrate 622 and after electrodes 440 have been formed along the sides of slots 623. In yet other implementations, substrate 622 is formed upon floor layer 650 prior to the forming of the slots 623 within substrate 622. Passages 424, 426 and 428 are completed by the formation of or provision of cover layer or cover panel 450, described above.

Figure 13:
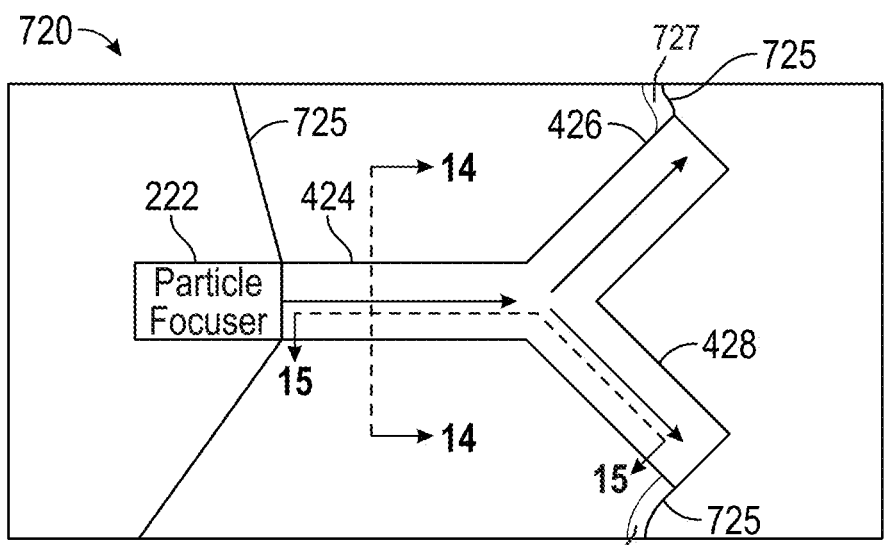
FIG. 13 is a schematic diagram of a portion of another example fluid entrained particle separator.
Figure 14:
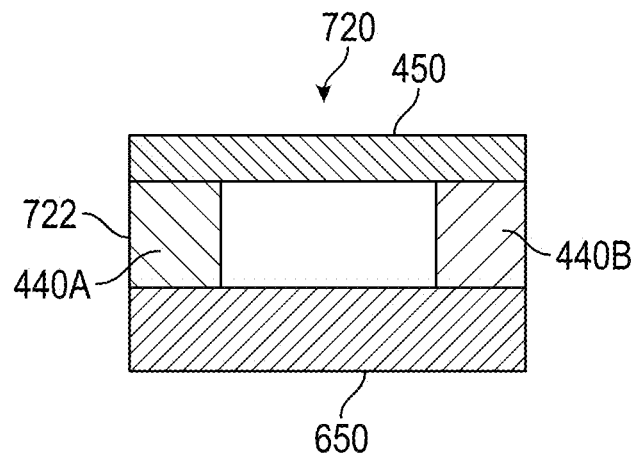
FIG. 14 is a sectional view of the fluid entrained particle separator of FIG. 13 taken along line 14-14.
Figure 15:
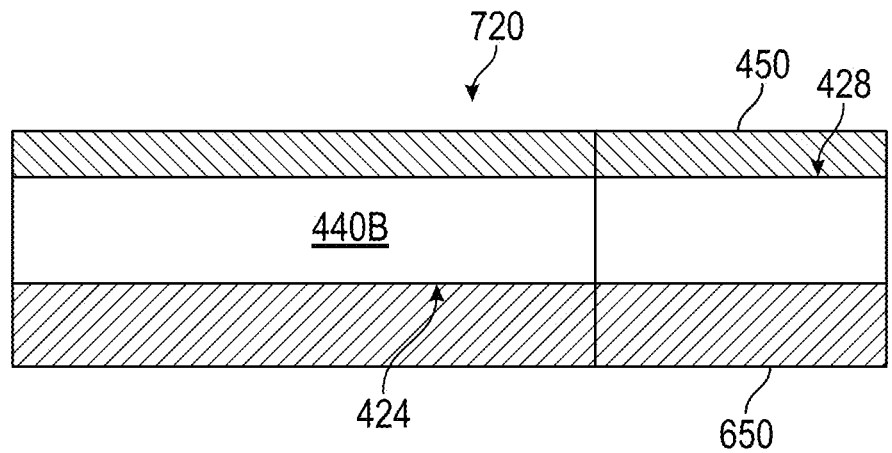
FIG. 15 is a sectional view of the fluid entrained particle separator of FIG. 13 taken along line 15-15.

FIGS. 13-15 illustrate another example fluid entrained particle separator 720. Separator 720 similar to separator 620 except that separator 720 comprises substrate 722 which also forms electrodes 440. FIG. 13 is a top view of separator 720. FIG. 14 is a sectional view of one example of separator 720 taken along line 14-14 of FIG. 13. FIG. 15 is a sectional view taken along line 15-15 of FIG. 13. In the example shown in FIGS. 13-15, passages 424, 426 and 428 are formed by channels extending completely through a substrate 722, where substrate 722 comprises a film or layer of electrically conductive material which also forms electrodes 440. As shown by FIG. 13, the different electrodes 440 are separated from one another by gaps or openings 725 in substrate 722 which are filled with electrically nonconductive or insulating material 727 such as silicon nitride. In other implementations, the different electrodes 440 may be separated from one another by such gaps or opening 725 which are void of material. Cover layer 450 and floor layer 650 (described above) sandwich substrate 722 therebetween to form passages 424, 426 and 428.

Figure 16:
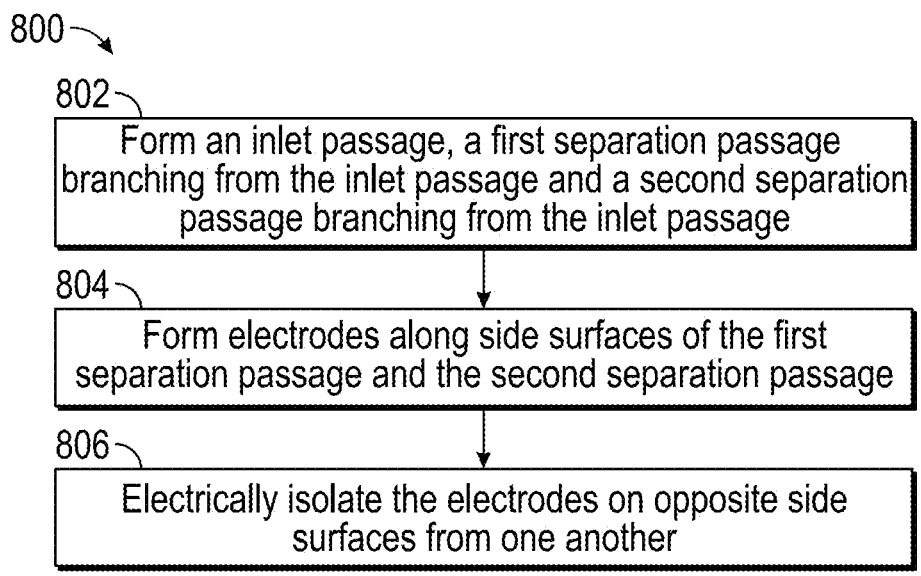
FIG. 16 is a flow diagram of an example method for forming a fluid entrained particle separator.

FIG. 16 is a flow diagram of an example method 800 for forming a fluid entrained particle separator. As indicated by block 802, an inlet passage, a first separation passage branching from the inlet passage and a second separation passage branching from the inlet passage or formed. As indicated by block 804, electrodes are formed along side surfaces of the first separation passage and the second separation passage. As indicated by block 806, the electrodes an opposite side surfaces of the first separation passage and the second separation passage are electrically isolated from one another. Method 800 may be utilized to form any of particle separators 420, 520, 620 and 720 described above.

Figure 17:
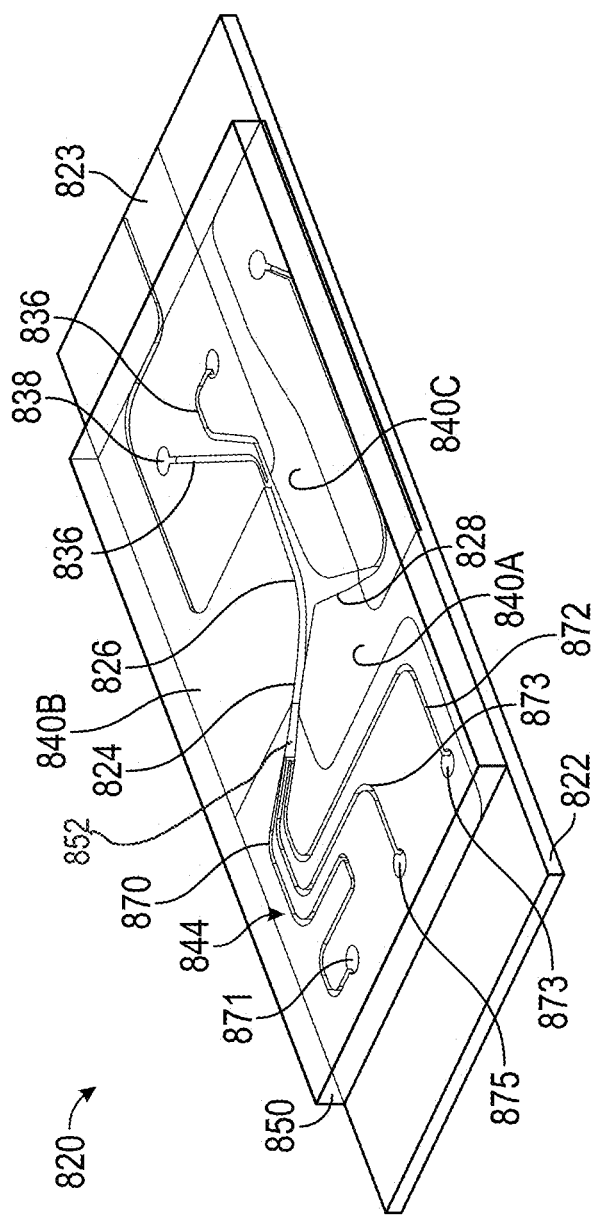
FIG. 17 is a top perspective view of portions of another example fluid entrained particle separator.
Figure 18:
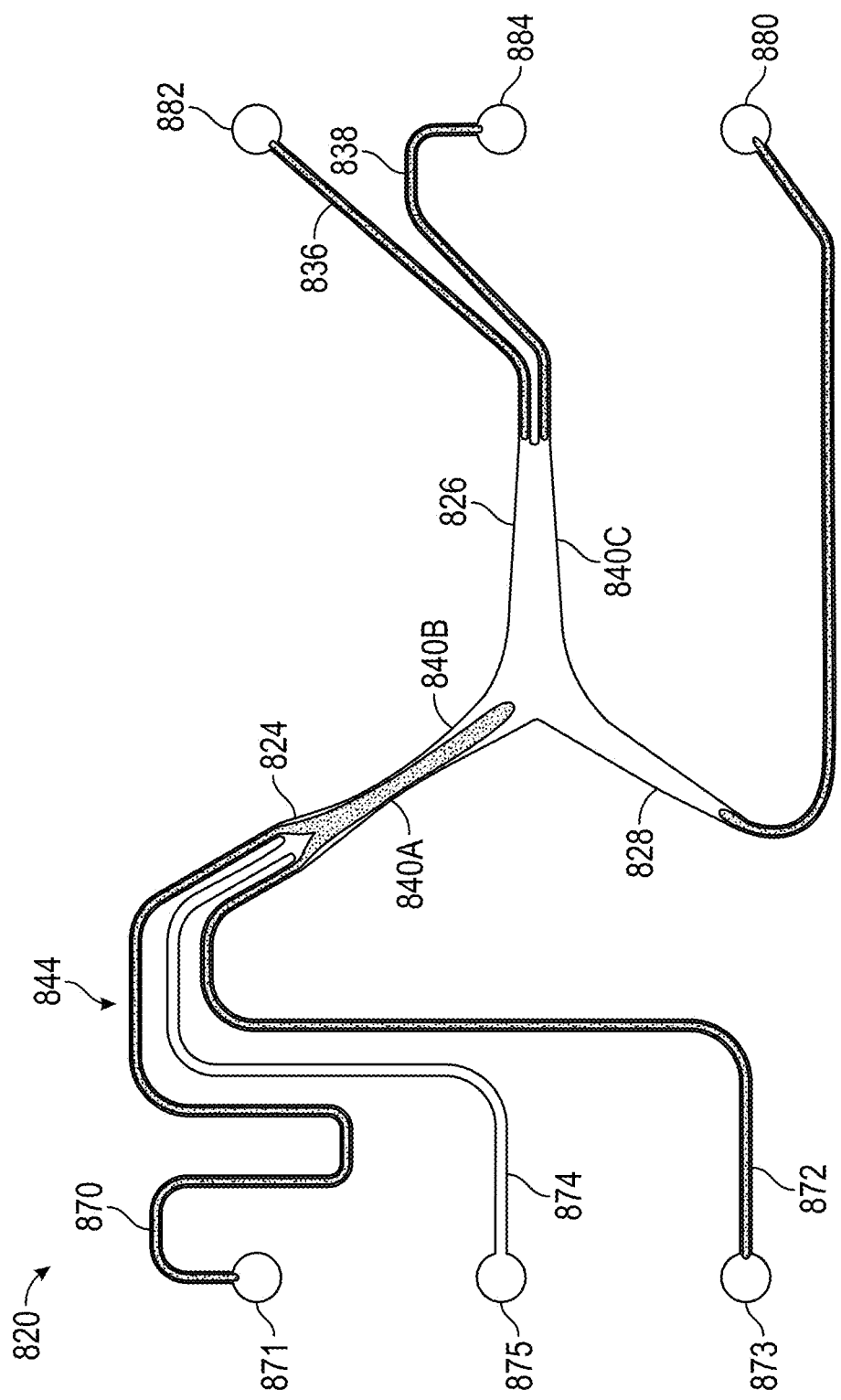
FIG. 18 is a top view of the fluid entrained particle separator FIG. 17.

FIGS. 17 and 18 illustrate another example fluid entrained particle separator 820. FIG. 17 is a top perspective view of particle separator 820. FIG. 18 is a top view of particle separator 820, Particle separator 820 comprises substrate 822, dielectric layer 823, inlet passage relate to floor, primary separation passages 826, 828, secondary separation passages 836, 838, electrodes 840A, 840B and 840C, particle focuser 844 and cover layer 850. Substrate 822 comprises at least one layer of material having a series of connected in branching grooves 852 formed therein which partially form passages 824, 826, 828, 836 and 838. In one implementation, grooves 852 are formed by imprinting or molding of a layer material forming substrate 822. In another implementation, grooves 852 are formed by cutting, ablation, etching or other material removal processes carried out on the layer or layers of material forming substrate 822. In another implementation, grooves 852 are formed by selective deposition, such as printing or additive manufacturing processes carried out upon an underlying base layer or platform.

In the example illustrated, substrate 822 comprises a material having an impedance less than or insufficiently greater than that of the stream of fluid particles to be directed through such passages 24, 26, 28. In one implementation, substrate 822 comprises a material having an impedance of less than 10,000 ohm centimeters. In one implementation, substrate 822 comprises a silken material having an impedance of less than 10,000 ohm centimeters.

Dielectric layer 823 comprising a layer of material formed upon or coating a floor and opposing sidewalls of grooves 852. Dielectric layer 823 is formed from a material and has a sufficient thickness such as electric field passes through and across the fluid within passages 824, 826, 828, 836, 838 rather than through substrate 822. In one implementation, dielectric layer 823 is formed from a material having sufficient dielectric properties and dimensioned such that the impedance of the path through layer 823 is at a level of at least five times that of the impedance of the path of the fluid across passages 824, 826 828, 836 and 838. In one implementation, layer 823 is formed from a material having sufficient dielectric properties and dimensioned such that the impedance of the path through layer 823 is at a level of at least 10 times that of the impedance of the path of the fluid across passages 824, 826, 828, 836 and 838. In one implementation, layer 823 is formed from material having an impedance of at least 10,000 ohm centimeters. In one implementation, layer 823 is formed from a material such as silicon nitride or silicon dioxide. It in yet other implementations, layer 823 may be formed from other materials having sufficient impedances.

Electrodes 840A, 840B, and 840C are provided to create electric fields across passages 824, 826, 828, 836 and 838. Electrodes 840 extend in a single plane such that they produce electric field that extends in the same plane as that of passages 824, 826, 828, 836 and 838. Because the separation passages, the electric field and the dielectrophoretic force extend in a single plane, the separation of particles is more predictable and less chaotic, producing more reliable results.

In the example illustrated, electrode 840A extends alongside passages 824 and 828. Electrode 840B extends alongside passages 824 and 828. Electrode 840C extends alongside passages 826 and 828. As should be appreciated, each of electrodes 840 may be a continuous electrode or may be formed by multiple separate elements connected to ground or a source of electrical current, such as an alternating frequency electric current source.

In one implementation, electrodes 840A and 840B are separated by a distance across inlet passage 824 by distance of at least 10 times a diameter of a target particle to be separated. Likewise, electrodes 840A and 840C as well as electrodes 840B and 840C are also separated by distance across separation passages 828 and 826, respectively, by a distance of at least 10 times a diameter of the target particle(s) being separated. This separation reduces the likelihood that the global electric field will not be significantly distorted by the presence of the particle such that similar separations are carried out on all particles in the flow.

In one implementation, electrodes 840A, 840B, and 840C are formed over dielectric layer 823 on the side surfaces of grooves 852 without extending across the floor of such grooves 852. In one implementation, electrodes 840A, 840B, and 840C are formed using directional sputtering or angled sputtering which deposits electrically conductive material on layer 823 on the sides of grooves 852 without or with minimal deposition on the floor of such grooves 852. In yet other implementations, the electrically conductive material that forms electrodes 840A, 840B, and 840C may be deposited upon layer 823 on the floor of grooves 852, wherein the electric conductive material on deposited on layer 823 on the floor of grooves 852 is subsequently removed while leaving electric conductive material on the sides to form electrodes 840A, 840B, and 840C.

In other implementations, substrate 822 may be formed from a material having an impedance greater than that of the stream of fluid particles to be directed through such passages 24, 26, 28 such that the electric field created by electrodes 440 will pass through the stream of fluid particles rather than through substrate 822. In one implementation, substrate 822 may be formed from material having an impedance of at least 10,000 ohm centimeters. In one implementation, substrate 822 is formed from a material such as glass, silicon nitride or silicon dioxide. It in yet other implementations, substrate 822 may be formed from other materials having sufficient impedances. In such implementations, dielectric layer 823 may be omitted, wherein substrate 822 forms the floor of passages 824, 86, 828, 836, 838 and wherein electrodes 840 are formed directly upon the sides of grooves 852, directly on substrate 822.

In yet other implementations, particle separator 820 may have an architecture and may be formed in a manner similar to that described above with respect to particle separators 620 or 720. In such implementations, passages 824, 86, 828, 836, 838 are defined or formed by through slots within a substrate, rather than grooves, wherein a floor layer underlies the substrate and forms the floor of the passages.

Particle focuser 844 is similar to particle focuser 222 described above except that particle focuser 844 is specifically illustrated as a hydrodynamic focuser. Particle focuser 844 comprises sheath flow passage 870, sheath flow passage 872 and particle flow passage 874. Sheath flow passages 870, 872 extended opposite sides of particle flow passage 874 and direct laminar flows or streams of buffer solutions which sandwich the supply of fluid entrained particles, such as a stream of blood, therebetween to focus the stream of fluid entrained particles into a laminar flow. The laminar flow of the stream of fluid entrained particles facilitates greater control over the subsequent separation of different particles from the stream. Each of passages 870, 872 and 874 converges at inlet passage 824.

In other implementations, particle focuser 844 may comprise other types of particle focusers. For example, particle focuser 844 may comprise a free flow negative dielectrophoresis particle focuser or a free flow isotachophoresis particle focuser. In some implementations, particle focuser 844 may be omitted.

In operation, the stream a fluid containing particles to be separated is supplied to passage 874 through an inlet 875. Likewise, streams of buffer solutions are supplied to passages eight 7872 through inputs 871 and 873, respectively. The streams of buffer solutions form sheet flows that sandwich the stream of fluid containing the parts to be separated, forming a laminar flow through inlet passage 824. In one implementation, the buffer solutions in each of sheath passages 870, 872 are supplied at a rate greater than the rate at which the solution containing the cell parser be separated are supplied. In one implementation, the buffer solutions are supplied at a rate of 0.2 mL per minute while the solution stream containing the parts to be separated supplied at a rate of 0.2 mL per minute.

Figure 19:
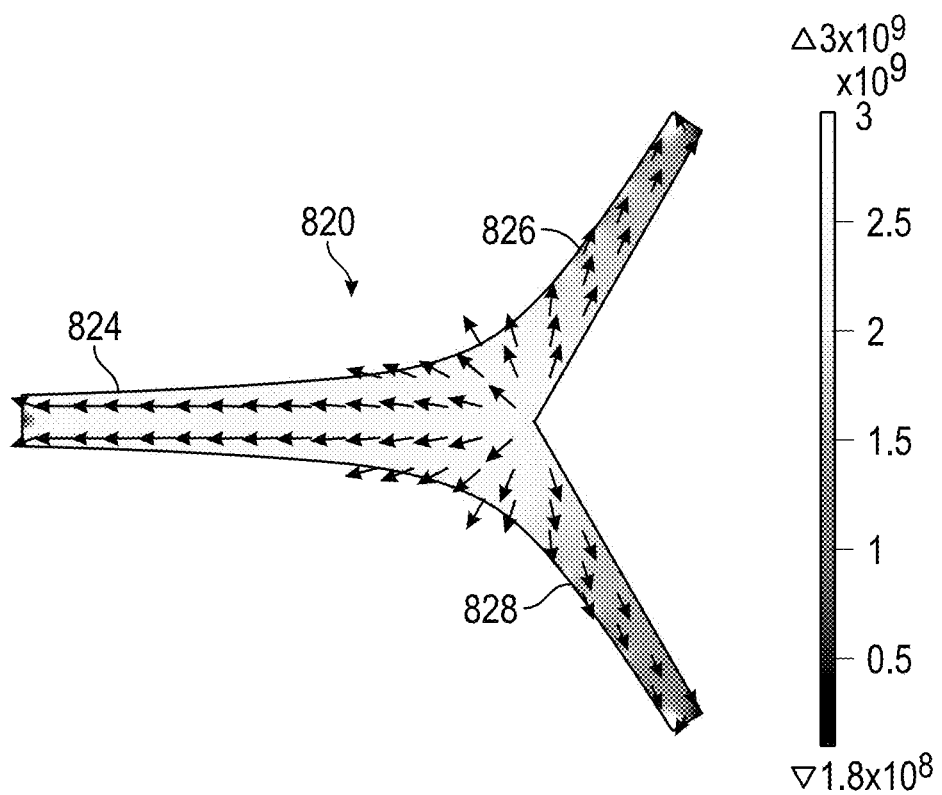
FIG. 19 is a graph illustrating dielectrophoretic forces generated in portions of the fluid entrained particle separator of FIG. 18.

Electrodes 840A and 840B are different electrical potentials to form an electric field across inlet passage 824, In one implementation, electrode 840A is at ground while electrode 840B is it a positive charge. Electric field creates dielectrophoretic forces. FIG. 19 is a diagram illustrating the generated dielectrophoretic forces, Due to differences in size and electrical polarizability, a first fraction or portion of particles having a first size and/or electrical polarizability within inlet passage 824 are forced towards separation passage 828 while a second fraction or portion of particles having a second size and/or a second electrical polarizability different than that of the particles of the first fraction are forced towards separation passage 826. The separated particles channeled to separation passage 828 are directed to outlet 880.

The separated particles directed to separation passage 826 are further separated by dielectrophoretic forces produced by an electrical field generated by electrodes 840B and 8400, In one implementation, when electrode 840B is added positive charge, electrode 840C is that a negative charge. Due to differences in size and electrical polarizability, a first fraction or portion of particles having a first size and/or electrical polarizability within separation passage 826 are forced towards separation passage 836 while a second fraction or portion of particles having a second size and/or a second electrical polarizability different than that of the particles of the first fraction are forced towards separation passage 838, The separated particles channeled to separation passage 836 are directed to outlet 882. The separated particles biased to separation passage 838 are directed to outlet 884.

Figures 20, 21:
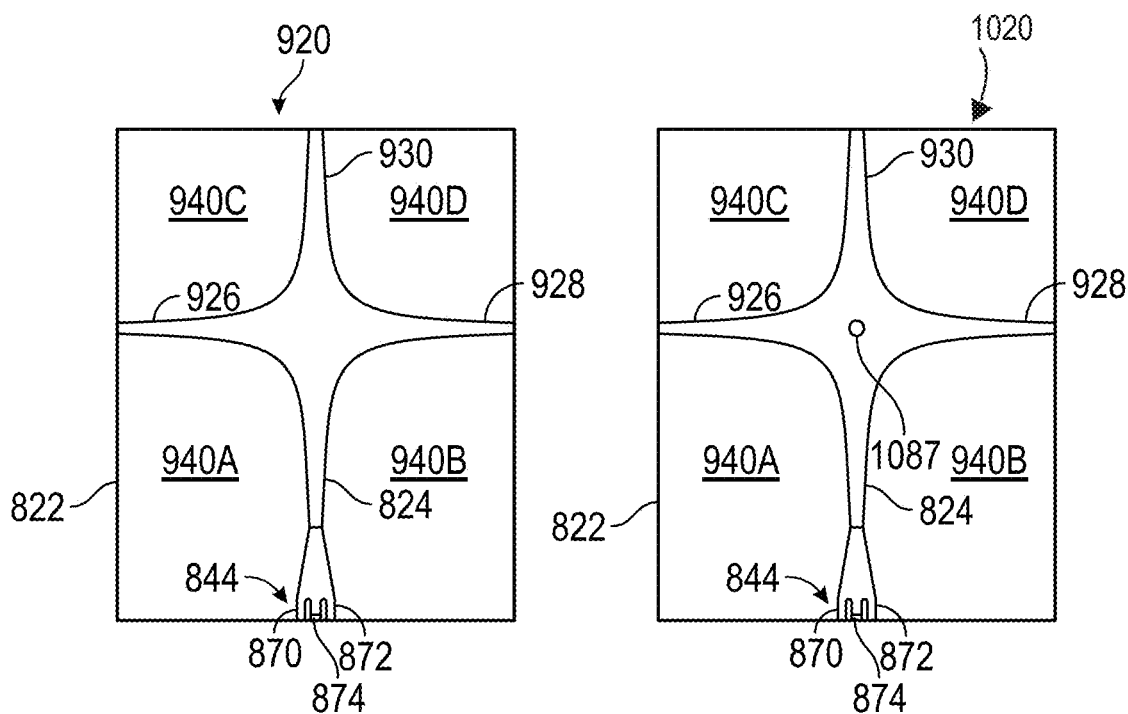
FIG. 20 is a top view schematically illustrating another example fluid entrained particle separator.
FIG. 21 is a top view schematically illustrating another example fluid entrained particle separator.

FIG. 20 is a top view of another example fluid entrained particle separator 920. Separator 920 is similar to separator 820 except that separator 920 comprises three separation passages, passages 926, 928 and 930, extending from inlet passage 824 and further comprises four electrodes which read different electrical charges, electrodes 940A, 940B, 940C and 940C (collectively referred to as electrodes 940). Passages 824, 926, 928 and 930 have an architecture similar to that of passages 824, 826 and 828. In one of limitation, such passages 824, 926, 928 and 930 are formed by grooves formed in a substrate, wherein the floor and sides of the grooves are coated or otherwise covered with a dielectric layer, similar to dielectric layer 423 described above and wherein electrodes 940 are formed on the side walls of the passages without extending across the floors of the passages. In other implementations where the substrate has a sufficient impedance, similar to the impedance of substrate 522 described above, the dielectric layer between the substrate and the electrodes may be omitted.

In operation, the stream of solution containing particles to be separated is focused by particle focuser 844 and directed into inlet passage 824. Electric field created across passage 824 by electrodes 940A and 940B forms dielectrophoretic forces that differently interact with differently sized particles or particles having different electric polarizability to direct such particles either to separation passage 926, separation passage 928 or separation passage 930, In some implementations, such separation passages may include additional secondary separation passages and electrodes as described above.

FIG. 21 is a top view of another example fluid entrained particle separator 1020. Separator 1020 is similar to separator 920 except that separator 1020 additionally comprises a column or pillar 1087. Those remaining components of separator 1020 which correspond to components a separator 920 are numbered similarly.

Pillar 1087 extends at a junction of passages 824, 96, 928 and 930, Pillar 1087 impedance the flow of solution or particles directly across the junction, from inlet passage 824 to separation passage 930. Pillar 1087 reduces the likelihood of particles entering separation passage 930 due to the momentum of the solution flowing through inlet passage 824 rather than due to the size or electric polarizability of the particles.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A fluid entrained particle separator comprising:
    an inlet passage to direct particles entrained in a fluid;
    a first separation passage branching from the inlet passage;
    a second separation passage branching from the inlet passage;
    electrodes to create an electric field exerting a dielectrophoretic force on the particles to direct the particles to the first separation passage or the second separation passage, wherein the first separation passage, the second separation passage, the electric field and the dielectrophoretic force are coplanar within a respective plane, wherein the electrodes comprise:
        an electrode connected to ground disposed along a wall common to, and at a junction of, the inlet passage and the second separation passage;
        a first electrode disposed along a wall common to the inlet passage and the first separation passage; and
        a second electrode disposed along a wall common to the first separation passage and the second separation passage, wherein the first electrode and the second electrode are arranged, in use, to bear opposite polarities.

2. The fluid entrained particle separator of claim 1, further comprising:
    a particle focuser to focus the particles into a laminar flow within the inlet passage.

3. The fluid entrained particle separator of claim 2, wherein the particle focuser comprises a hydrodynamic focuser.

4. The fluid entrained particle separator of claim 3, wherein the hydrodynamic particle focuser comprises a first sheath flow passage leading to the inlet passage and a second sheath flow passage leading to the inlet passage and a particle flow passage leading to the inlet passage, the particle flow passage to supply particles between sheath fluid from the first sheath flow passage and the second sheath flow passage.

5. The fluid entrained particle separator of claim 2, wherein the particle focuser is selected from a group of particle focusers consisting of a free flow negative dielectrophoresis particle focuser and a free flow isotachophoresis particle focuser.

6. The fluid entrained particle separator of claim 1, wherein the first separation passage and the second separation passage each include opposing side walls and wherein the electrodes have faces parallel to and along the opposing sidewalls.

7. The fluid entrained particle separator of claim 1, further comprising:
    a third separation passage branching from the first separation passage; and
    a fourth separation passage branching from the first separation passage, wherein the electric field exerts a dielectrophoretic force on the particles to direct the particles in the first separation passage to the third separation passage or the fourth separation passage, wherein the third separation passage and the fourth separation passage extend in the plane.

8. The fluid entrained particle separator of claim 1, further comprising:
    a third separation passage branching from the inlet passage and extending in the plane, wherein the electric field exerts a dielectrophoretic force on the particles to direct the particles in the inlet passage to the first separation passage, the second separation passage or the third separation passage.

9. The fluid entrained particle separator of claim 1, wherein the first separation passage and the second separation passage each comprise a floor surface formed from a material having an impedance of at least 10,000 ohm centimeters.

10. The fluid entrained particle separator of claim 1 comprising:
    a substrate having an impedance of at least 10,000 ohm centimeters;
    a first layer on the substrate forming the electrodes, wherein the inlet passage, the first separation passage and the second separation passage are formed in the layer; and
    a second layer on the first layer, wherein the substrate and the second layer form a floor and a ceiling, respectively, of each of the inlet passage, the first separation passage and the second separation passage.

11. The fluid entrained particle separator of claim 1 comprising:
    a layer having an impedance of at least 10,000 ohm centimeters, the layer forming a channel that forms the inlet passage, the first separation passage and the second separation passage; and
    layers of electrode material on opposite sidewalls of the channel to form the electrodes.

12. A method for separating particles entrained in a fluid, the method comprising:
    directing particles entrained in a stream through an inlet passage;
    applying an electric field in a plane to the stream via electrodes to exert dielectrophoretic forces in the plane on the particles to divert a first subset of the particles in the stream into a first separation passage extending in the plane and to divert a second subset of the particles in the stream into a second separation passage extending in the plane, wherein the first separation passage, the second separation passage, the electric field, and the dielectrophoretic forces are coplanar within a respective plane and the electrodes comprise:
        an electrode connected to ground disposed along a wall common to, and at a junction of, the inlet passage and the second separation passage;
        a first electrode disposed along a wall common to the inlet passage and the first separation passage; and a second electrode disposed along a wall common to the first separation passage and the second separation passage, wherein the first electrode and the second electrode are arranged, in use, to bear opposite polarities.

13. The method of claim 12, further comprising:
focusing the particles in the stream.

14. The method of claim 12, wherein the inlet passage, the first separation passage and the second separation passage each have a floor and sidewalls, wherein the sidewalls have a layer of electrically conductive material forming electrodes that apply the electric field and wherein the floor has an impedance higher in impedance of the stream.

15. A method for forming a fluid entrained particle separator, the method comprising:
forming an inlet passage, a first separation passage branching from the inlet passage and a second separation passage branching from the inlet passage;
forming electrodes along side surfaces of the first separation passage and the second separation passage; and
electrically isolating the electrodes on opposite side surfaces from one another, wherein the first separation passage, the second separation passage, an electric field created by the electrodes, and a dielectrophoretic force exerted by the electric field are coplanar within a respective plane and the electrodes comprise:
an electrode connected to ground disposed along a wall common to, and at a junction of, the inlet passage and the second separation passage;
a first electrode disposed along a wall common to the inlet passage and the first separation passage; and
a second electrode disposed along a wall common to the first separation passage and the second separation passage, wherein the first electrode and the second electrode are arranged, in use, to bear opposite polarities.

* * * * *